United States Patent
Spykerman et al.

(10) Patent No.: US 7,533,918 B2
(45) Date of Patent: May 19, 2009

(54) CONSOLE STORAGE ENCLOSURE

(75) Inventors: David J. Spykerman, Chandler, AZ (US); Jeffrey L. Barber, Zeeland, MI (US); Michael R. Catlin, Holland, MI (US); Gregory N. Brncick, Holland, MI (US); Kevin W. J. Kim, Vista, CA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

(21) Appl. No.: 11/835,764

(22) Filed: Aug. 8, 2007

(65) Prior Publication Data

US 2008/0079279 A1 Apr. 3, 2008

Related U.S. Application Data

(63) Continuation of application No. PCT/US2006/004524, filed on Feb. 8, 2006.

(60) Provisional application No. 60/651,589, filed on Feb. 9, 2005.

(51) Int. Cl.
*B60R 13/00* (2006.01)

(52) U.S. Cl. .................... 296/24.34; 296/37.8
(58) Field of Classification Search .............. 296/24.34, 296/37.8
See application file for complete search history.

(56) References Cited

U.S. PATENT DOCUMENTS

| 6,032,587 | A | 3/2000 | Salenbauch et al. |
| 2003/0155786 | A1* | 8/2003 | Kim et al. ................. 296/24.1 |
| 2006/0043752 | A1* | 3/2006 | Oana ......................... 296/37.8 |
| 2006/0066118 | A1* | 3/2006 | Radu et al. ................ 296/37.8 |
| 2006/0071497 | A1* | 4/2006 | Radu et al. ............... 296/24.34 |

FOREIGN PATENT DOCUMENTS

| DE | 195 42 198 A1 | 5/1997 |
| FR | 2 792 590 A1 | 10/2000 |

OTHER PUBLICATIONS

International Search Report from related International Application No. PCT/US2006/004524, filed Aug. 2, 2006.

* cited by examiner

*Primary Examiner*—Lori L Lyjak
(74) *Attorney, Agent, or Firm*—Foley & Lardner LLP (57) ABSTRACT

This disclosed console is for mounting within a vehicle. The console includes a base configured to be coupled to the vehicle and a storage enclosure coupled to the base. The storage enclosure is movable between a first position and a second position relative to the base such that a first occupant is provided access to the storage enclosure. The storage enclosure is movable between a stowed position and a deployed position. The deployed position is configured to provide access to a second occupant.

26 Claims, 6 Drawing Sheets

CONSOLE STORAGE ENCLOSURE

CROSS-REFERENCE TO RELATED PATENT APPLICATIONS

The present application is a continuation of International Application PCT/US2006/004524 which has an international filing date of Feb. 8, 2006, which was published as WO 2006/086524 A2 on Aug. 17, 2006, and which claims priority to U.S. Provisional Patent Application No. 60/651,589, filed Feb. 9, 2005, all aforementioned applications being incorporated herein by reference in their entireties.

BACKGROUND OF THE INVENTION

The present invention relates generally to the art of storage and holding systems for vehicles, and more particular, to console systems. In the most preferred embodiment of the present invention, a bin is movable in the fore and aft directions and is accessible to occupants in more than one row of seating.

Console systems for vehicle interiors are generally known. Such known console systems may include storage enclosures and/or armrests that are formed or mounted on a base and/or vehicle floor. However, such known console systems tend to be relatively permanent in their configuration such that they are not accessible to vehicle occupants in more than one row of seating. The user of the console and/or vehicle has little choice but for a console accessibility configuration as provided by the vehicle manufacturer.

Accordingly, it would be advantageous to provide a console that is movable to provide access (i.e., physical and/or visual) for the occupants in more than one row of seating (e.g., front row occupants and back row occupants in a vehicle with two rows of seats). It would also be advantageous to provide one row of occupants with access through a pivoting armrest or by sliding a storage bin forward (fore), and to provide another row of occupants with access by sliding the storage bin rearward (aft). Accordingly, it would be desirable to provide a console storage enclosure having one or more of these or other advantageous features.

To provide an inexpensive, reliable, and widely adaptable console storage enclosure that avoids the above-referenced and other problems would represent a significant advance in the art.

SUMMARY OF THE INVENTION

A primary feature of the present invention is to provide an inexpensive, easy-to-manufacture and aesthetically-pleasing console storage enclosure that overcomes the above-noted disadvantages.

Another feature of the present invention is to provide a console storage enclosure that is accessible to multiple persons.

Another feature of the present invention is to provide a console storage enclosure that is accessible to vehicle occupants in different seating arrangements.

Another feature of the present invention is to provide a console storage enclosure that has a latch that is accessible to occupants in different seating rows.

How these and other advantages and features of the present invention are accomplished (individually, collectively, or in various subcombinations) will be described in the following detailed description of the preferred and other exemplary embodiments, taken in conjunction with the FIGURES. Generally, however, they are accomplished in a console including a base, an armrest, and a storage enclosure. The base is coupled to the vehicle. The armrest is coupled to the base and moves (e.g., pivots or translates) between a first position (usable by a first occupant as an armrest) and a second position (to provide the first occupant access to the storage enclosure). The storage enclosure is movable between a stowed position and a deployed position wherein the deployed position provides access for a second occupant.

These and other advantages and features of the present invention may also be accomplished in a console including a storage enclosure that slides between a stowed position within the base and a deployed position at least partially extending from the base.

These and other advantages and features of the present invention may also be accomplished in a console including a latch that allows occupants in different seating rows to unlatch the storage enclosure so it can be moved and accessed The present invention further relates to various features and combinations of features shown and described in the disclosed embodiments. Other ways in which the objects and features of the disclosed embodiments are accomplished will be described in the following specification or will become apparent to those skilled in the art after they have read this specification. Such other ways are deemed to fall within the scope of the disclosed embodiments.

DETAILED DESCRIPTION OF THE PREFERRED EMBODIMENTS

Before proceeding to the detailed description of the preferred and exemplary embodiments of the present invention, several comments can be made about the general applicability and the scope thereof.

First, while the components of the disclosed embodiments will be illustrated as a storage enclosure/bin designed for a vehicle, the features of the disclosed embodiments have a much wider applicability. For example, the storage enclosure design is adaptable for a variety of storage units, bins, containers, and other vehicle environments that employ a storage space or surface that could advantageously provide use and/or access to persons in different areas. Further, the size of the various components and the size of the storage enclosure and console can be widely varied.

Second, the particular materials used to construct the exemplary embodiments are also illustrative. For example, injection molded high density polyethylene is the preferred method and material for making the top and base, but other materials can be used, including other thermoplastic resins such as polypropylene, other polyethylenes, acrylonitrile butadiene styrene ("ABS"), polyurethane nylon, any of a variety of homopolymer plastics, copolymer plastics, plastics with special additives, filled plastics, etc. Also, other molding operations may be used to form these components, such as blow molding, rotational molding, etc. Components of the storage enclosure or console can also be manufactured from stamped, extruded, cast, etc. alloy materials such as steel or aluminum.

Third, it is important to note that the term "storage enclosure," "bin," "console," and "access" are intended to be broad terms and not terms of limitation. These components may be used with any of a variety of products or arrangements and are not intended to be limited in application. Reference to "front row," "second row," or the like are not intended to be terms of limitation but are used as general reference to distinguish two different rows of seating. The console may also be used between a second row seating and a third row seating, or the like.

Figure 1:
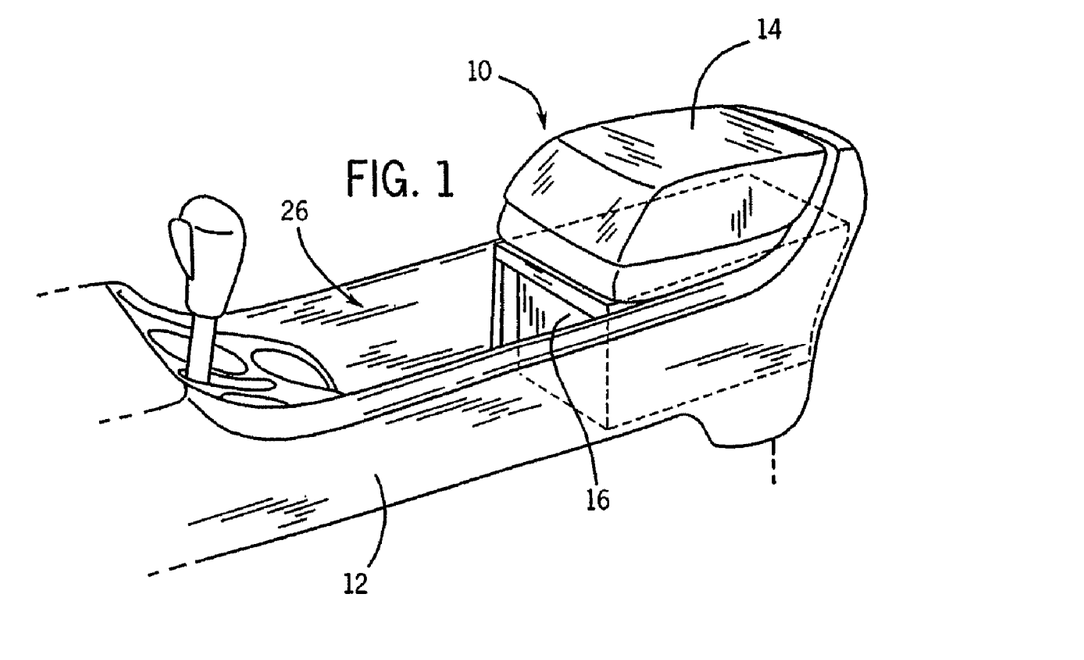
FIG. 1 is a first perspective view of a console according to an exemplary embodiment.
Figure 2:
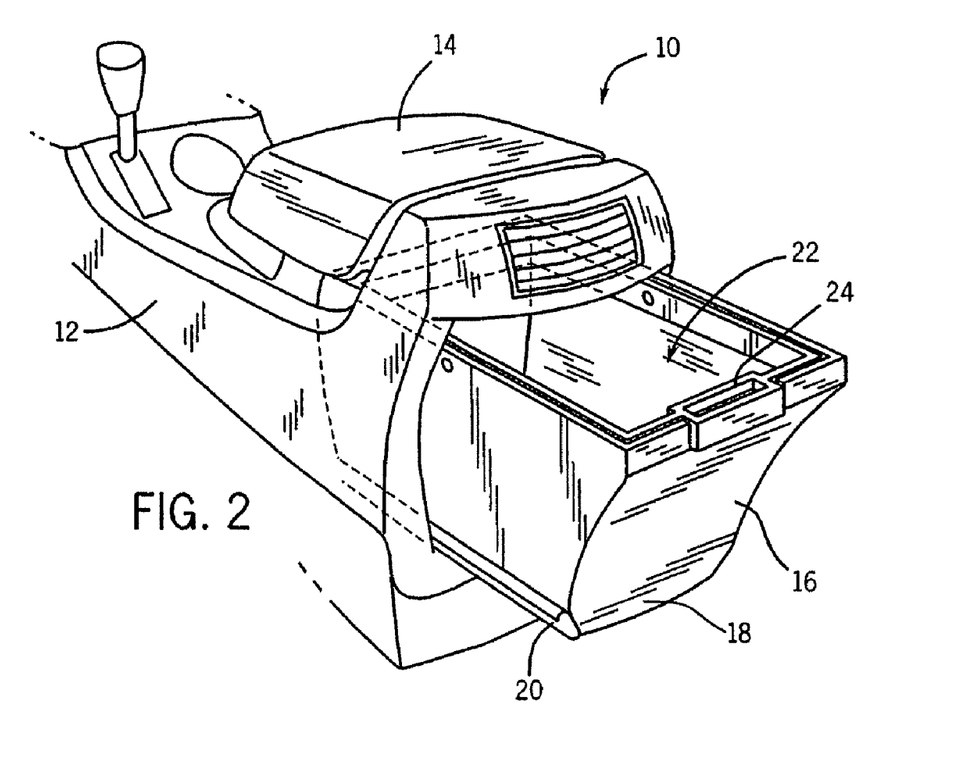
FIG. 2 is a rear perspective view of the console of FIG. 1 with a bin in a deployed position.

Proceeding now to descriptions of the preferred and exemplary embodiments, FIGS. 1-2 show a console 10 according to an exemplary embodiment of the present invention. The console 10 includes a base 12, a panel (shown as an armrest 14), and a storage enclosure 16. The console 10 is configured to be located between a pair of front row seats (i.e., a "center console"). As such, the storage enclosure 16 is configured to be accessible (i.e., physically and/or visually) to the occupants in the front row of seats and to the occupants in the row of seats behind the front row.

The base 12 is configured to be mounted to a floor of a vehicle. According to an alternative embodiment, the base is mounted on rails so that it can be repositioned within the interior of the vehicle or detached and removed. According to an alternative embodiment, the base and/or console is modular so that it can be repositioned, replaced, removed, or the like within the vehicle interior.

The armrest 14 is configured to pivot about an axis (e.g., provided by a hinge) to provide access for the occupants seated next to console 10 (e.g., the front row occupants for the console 10). According to a preferred embodiment, the axis is cross-car (direction) such that the armrest 14 pivots about its rear portion. According to an alternative embodiment, the axis extends in the fore aft direction of the vehicle so that the armrest pivots on its side portion. According to an exemplary embodiment, the armrest is movable between a forward (extended) position and a rearward (or stowed) position. According to an alternative embodiment, the panel may be a lid to the bin that may or may not be intended to provide armrest functionality.

The storage enclosure 16 is shown as a bin 18, but may be any of a variety of storage devices (e.g., storage units, a drawer, a compartment, a tray, a shelf, etc.). The bin 18 is coupled to the base 12 and movable (e.g., slidable) between a stowed (retracted) position and a deployed (e.g., extended) position. According to a preferred embodiment, a pair of guides 20 (e.g., tracks, rails, slides, bearings, etc.) provide fore/aft translating movement for the bin 18. As shown, the bin 18 has a single storage area 22, but may be divided (e.g., with dividers, panels, walls, fabric, netting, etc.) to provide a plurality of storage areas and/or a storage area associated with each row of occupants. The bin 18 may be a single molded article or multiple components or panels coupled together (e.g., end caps and center members).

The bin 18 is moved from the stowed position to the deployed position, for example, by a front row occupant pushing on the front of the bin. Alternatively, the bin may be moved from the stowed position to the deployed position by a second row occupant by grabbing the bin through apertures 24 (e.g., finger holes or openings) and pulling in the aft direction of the vehicle. Any variety of user interfaces may be used to allow the occupants to move the bin (e.g., a handle, a knob, a recess, a detent, etc).

In the stowed position, the storage area 22 of the bin 18 is accessible to the front row occupants upon the lifting of the armrest 14. In the deployed position, the storage area 22 of the bin 18 is accessible to the second row occupants. An open storage area 26 (e.g., a tray, a bin, a shelf, a compartment, etc.) located in front of the bin 18 is enlarged (e.g., expanded) when bin 18 is in the deployed position. When slid in the aft position (assuming no center second row occupant) the sliding of the bin provides additional console storage volume. Increasing the console storage capacity is advantageous. As such, the open storage area 26 may accommodate larger articles (e.g., bags, purse, devices, etc.). Additionally, the sliding bin can be filled and can remain filled throughout the entire sliding process. Allowing movement, resulting in increased storage capacity, without disturbing long term storage (i.e., bin storage) is also advantageous.

Figure 3:
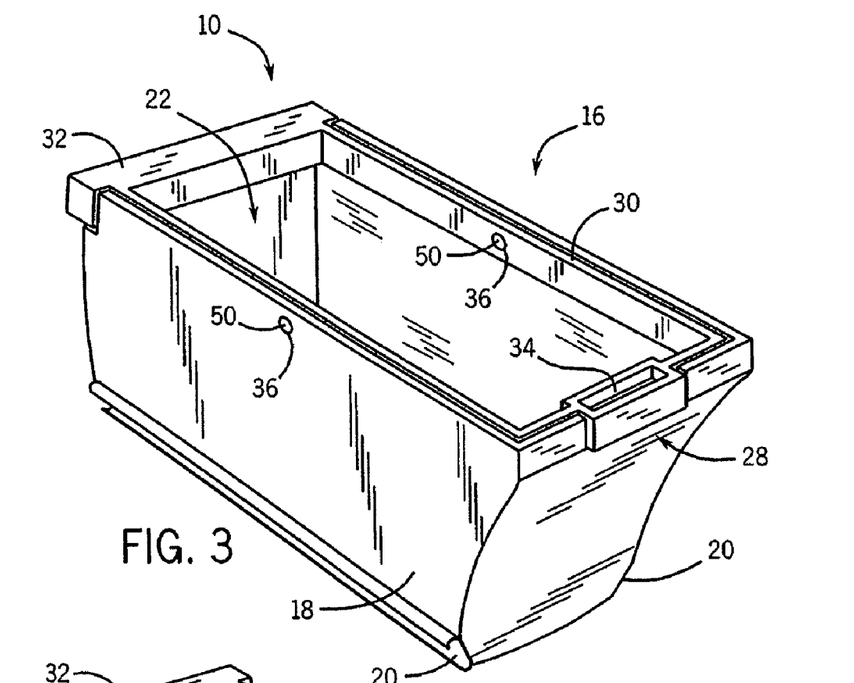
FIG. 3 is a perspective view of a storage bin according to an exemplary embodiment.
Figure 4:
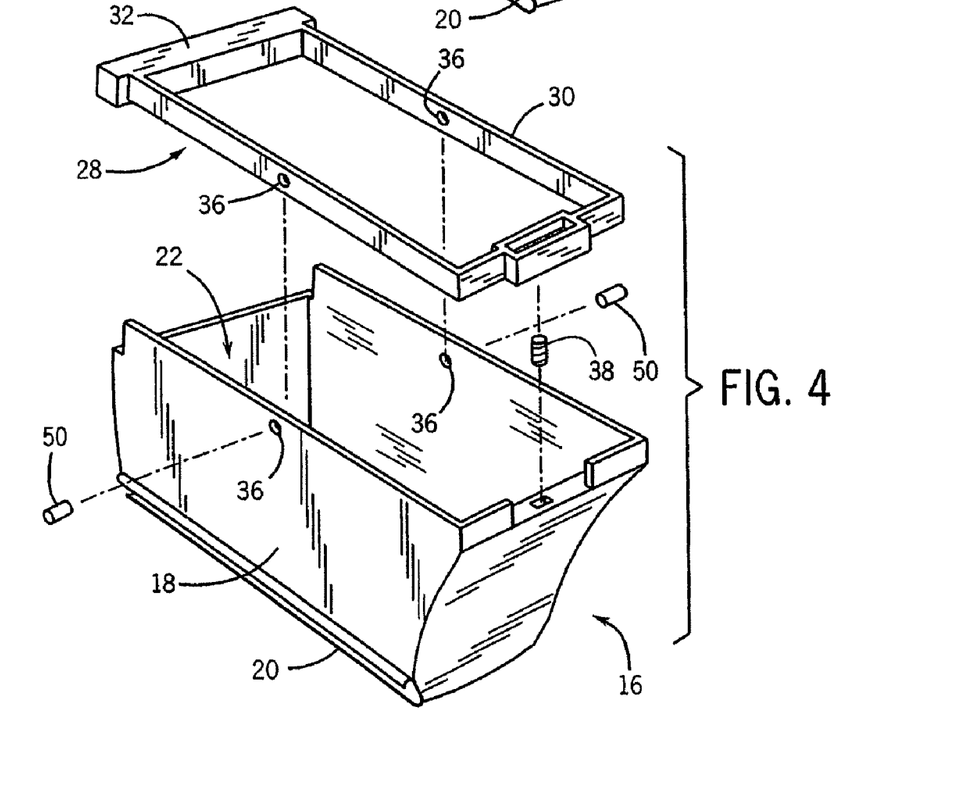
FIG. 4 is an exploded view of the bin and latch according to an alternative embodiment.
Figure 5:
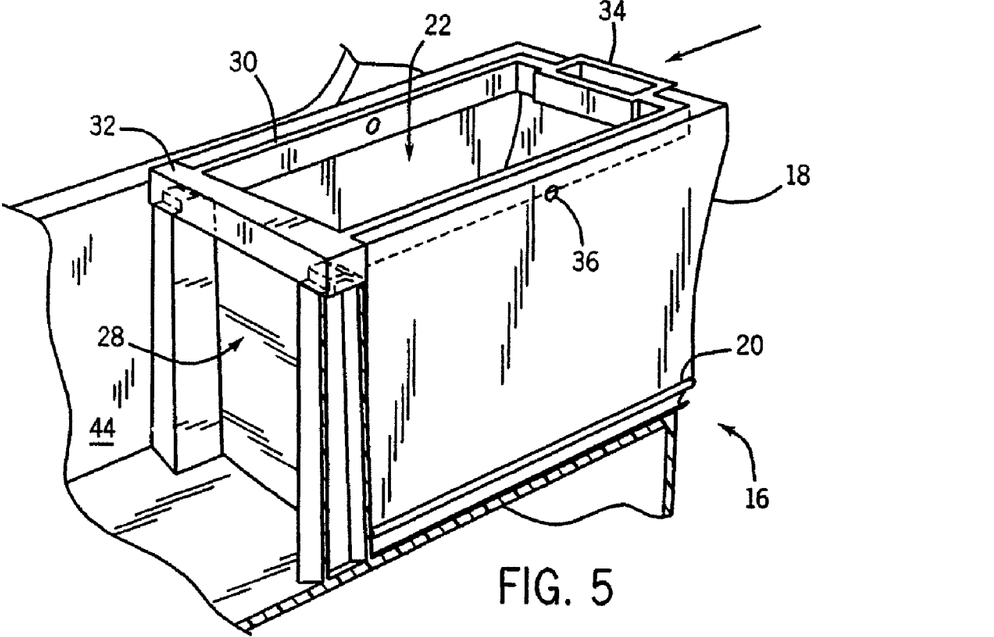
FIG. 5 is a fragmentary sectional perspective view of the bin mounted within a base and in the stowed position.

According to a preferred embodiment of the present invention shown in FIGS. 3 and 4, the console 10 further includes a latch 28 configured to releasably retain the bin 18 in the stowed position and/or deployed position. The bin 18 is movable by disengaging the latch 28 and then applying a force to the bin 18 as described above. The latch 28 is shown as a generally rectangular member 30 disposed generally about the periphery of the upper portion of the bin 18 and is configured to be operated or moved between an engaged position (where the latch locks or retains the bin to prevent or inhibit the bin from being moved) and a disengaged position (where the bin may be moved between the stowed position and the deployed position). The member 30 may be integrally formed/molded or be separate components that are joined together (e.g., fasteners, bolted, etc.).

The member 30 of the latch 28 includes a forward latch interface 32, a rearward latch interface 34, a pivot 36, and a biasing member (shown as a spring 38).

Figure 6:
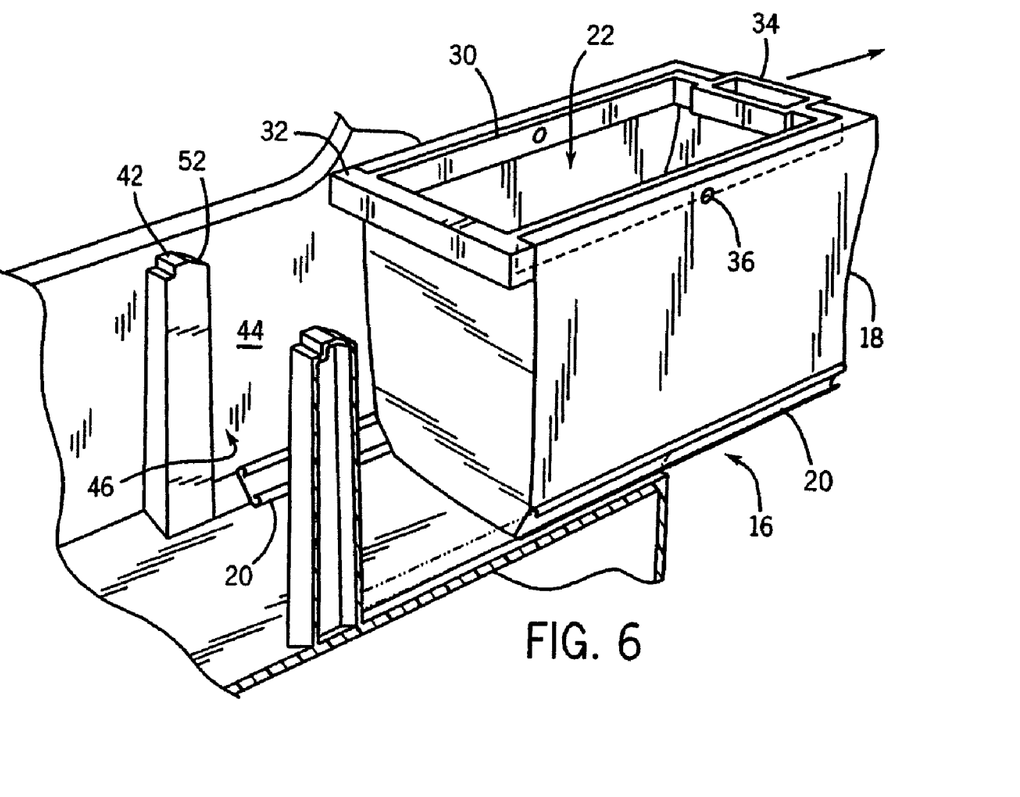
FIG. 6 is a fragmentary sectional perspective view of the bin of FIG. 5 in the deployed position.
Figure 7:
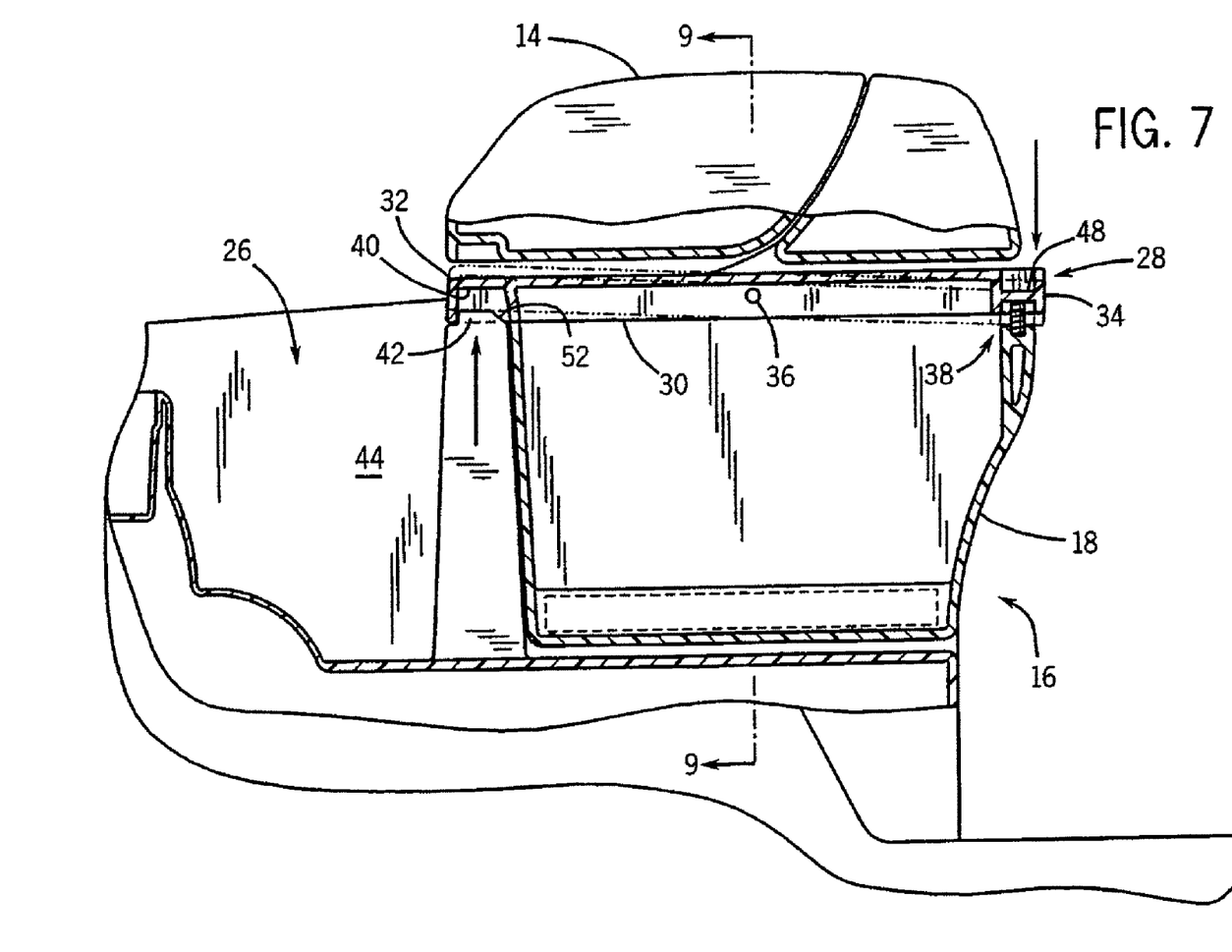
FIG. 7 is a side sectional view of a console enclosure with a bin in a stowed position.
Figure 8:
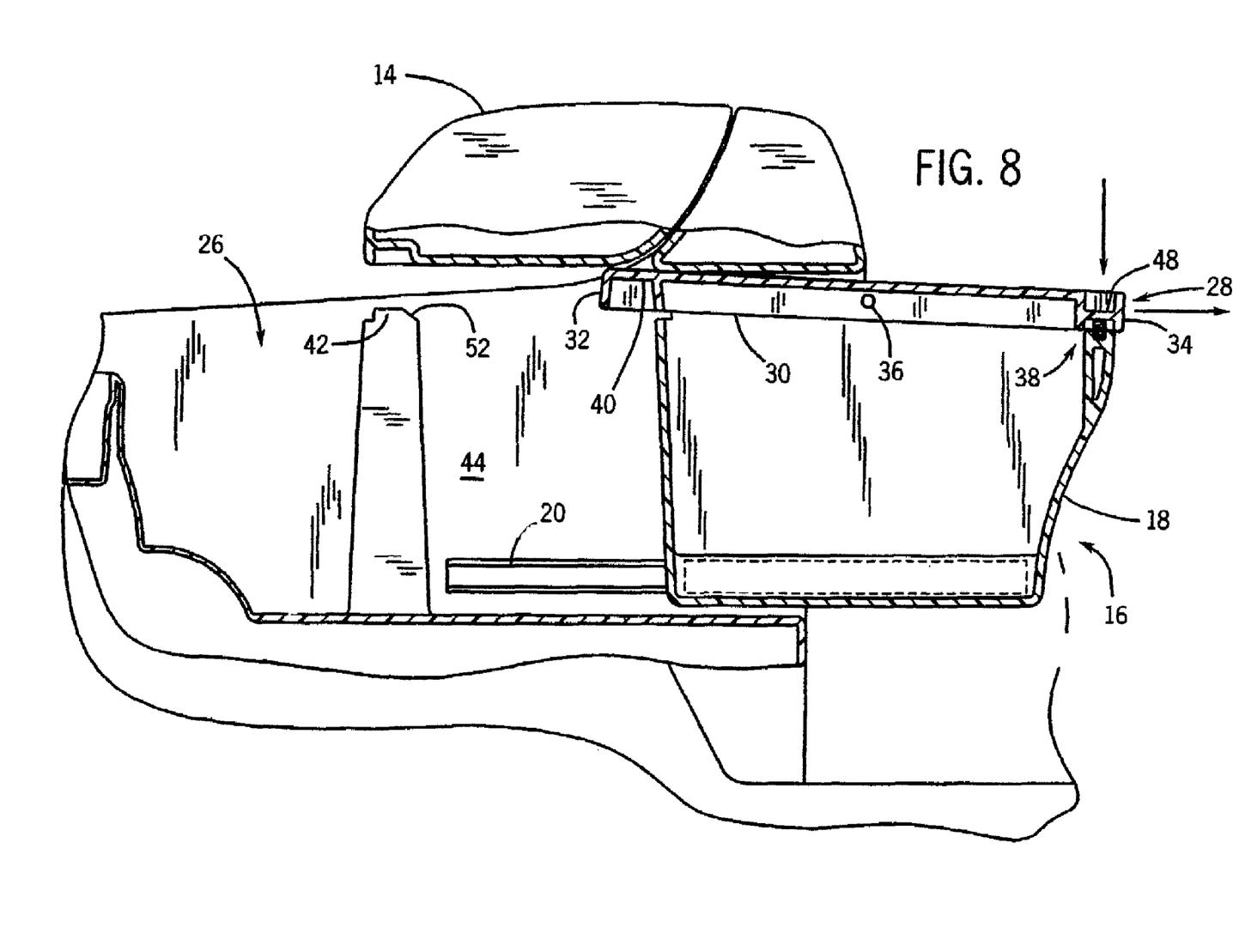
FIG. 8 is a side sectional view of the console enclosure of FIG. 7 with the bin in the deployed position.
Figure 9:
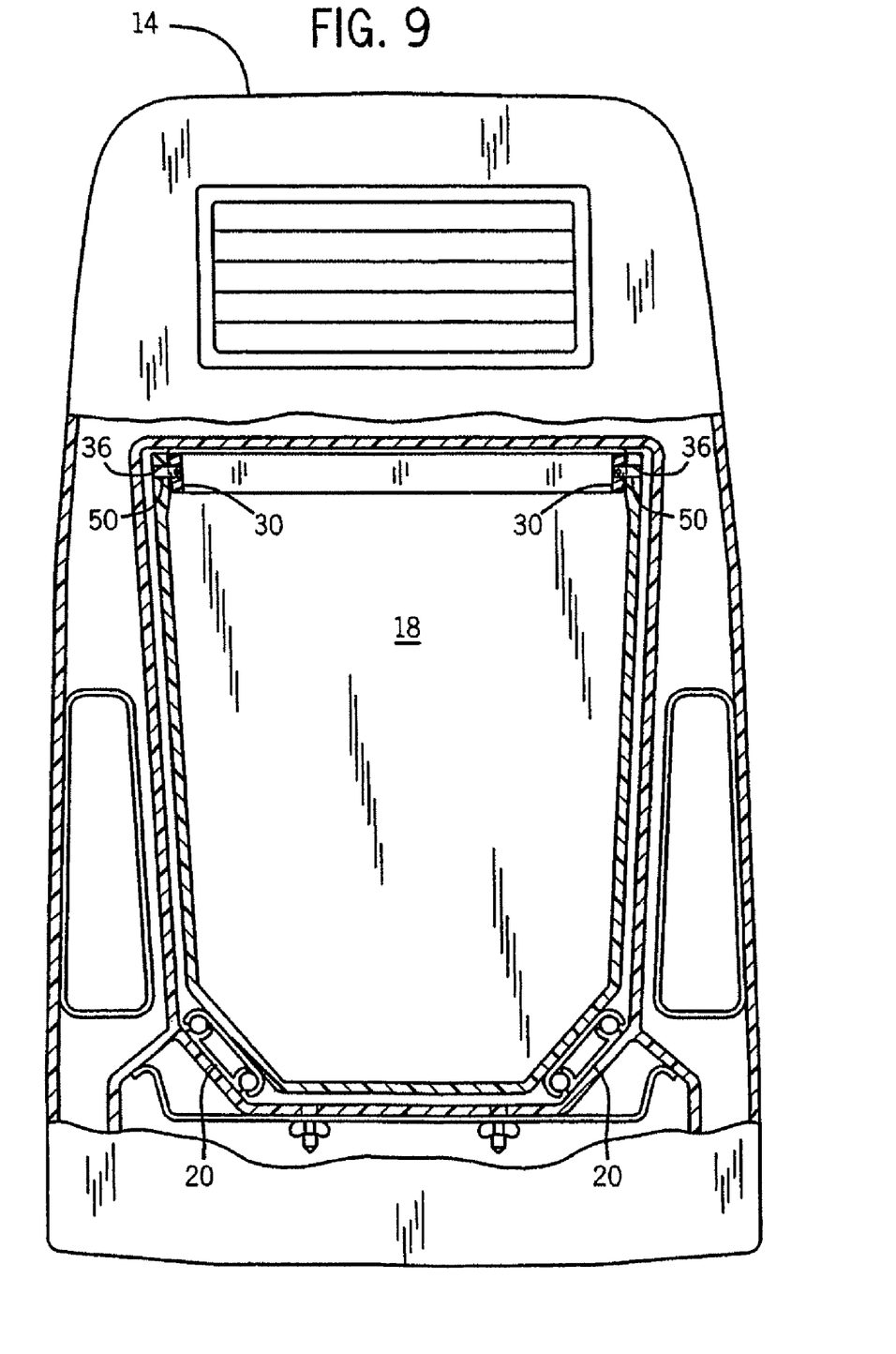
FIG. 9 is a rear sectional view of a console enclosure system according to an exemplary embodiment.

Referring to FIGS. 1, 3, and 7, the forward latch interface 32 is configured to allow the front row occupants to unlatch the bin 18. The forward latch interface 32 includes a recess 40 that engages a projection 42 extending from the base 12 to the latch 28 or retain the bin 18 in the stowed position. The first row occupant wraps his or her fingers around the forward latch interface 32 and pulls up (e.g., against armrest 14). The engagement of the projection 42 and the recess 40 prevents or inhibits the bin 18 from being moved between the stowed position and the deployed position. According to alternative embodiments, the projection may extend from a variety of locations on base. As shown in FIGS. 6 and 8, the projection extends along the wall 44 of the base 12 and at least partially provides separation (i.e., divides) the space between the open storage area 26 and the space 46 that receives the bin 18. According to an alternative embodiment, the bin 18 is configured to move forward into the open storage area 26 to provide access to the front row occupants. According to alternative embodiments, the projection may extend from the bin to engage a recess on the base.

Referring to FIGS. 2, 3, and 7, the rearward latch interface 34 is configured to allow the second row occupants to unlatch the bin 18 so that it can be moved between the stowed position and the deployed position. According to a preferred embodiment, the rearward latch interface 34 includes a recessed surface 48 for the second row occupants to insert one or more fingers to push the member 30 down (e.g., rocker) and then pull rearwardly (aft). The surface 48 may be recessed, flat or planer, or the like.

According to a preferred embodiment, the latch 28 is mounted to the bin 18 by the pivot 36, which allows the latch 28 to pivot between a latch position and an unlatched position. Preferably, the pivot 28 is integrally molded with the member 30 and engages openings in the bin 18 or the armrest 14. According to an alternative embodiment, the pivot is integrally molded to the member or the bin and engages openings in the other component (e.g., bin 18 or other member or component). According to an exemplary embodiment shown in FIG. 4, the pivot is a separate component (e.g., pin 50) that couples the member 30 to the bin 18 (e.g., a post, an axle, a pin, etc.).

Referring to FIG. 4, the spring 38 is configured to bias the latch 28 (i.e., pivot the member 30) in the latched position. To move or operate the latch 28 from the latched position to the unlatched position, the occupant applies sufficient force to overcome the biasing force provided by the spring 38. According to an exemplary embodiment, the spring is a compression spring coupled to a boss on the bin. Alternatively, the spring is a leaf spring extending from the bin. In other alternative embodiments, any of a variety of biasing members may be used to provide the desired biasing force.

Referring to FIG. 7, for the front occupant to operate (e.g., actuate, unlatch, move, engage, disengage, etc.) the latch 28 from the latched position to the unlatched position, he or she grips the forward latch interface 32 with his or her fingers and lifts up so that the recess 40 disengages from the projection 42. In the unlatched position, the bin 18 can be pushed rearwardly (aft) or pulled forward to provide access.

For the second row occupant to operate the latch 28 from the latched position to the unlatched position, he or she inserts one or more fingers onto the surface 48 and presses down so that the recess 40 disengages from projection 42. In the unlatched position, the bin 18 can be pulled rearwardly (aft) or pushed forward. According to an alternative embodiment, the latch may be reversed configured, for example, so that the second row occupant pushes the rearward latch interface up and the first row occupant pushes the forward latch interface down.

When the bin 18 is being moved from the deployed position to the stowed position, the forward latch interface 32 slides along an angled or slated ramp portion 52 of the projection 42 until the recess 40 clears the edge of the projection 42 and pivots (e.g., snaps) into place due to the biasing force of spring 38. Alternatively, the projection may have any of a variety of shapes, positions, orientations, sites, configurations, or the like.

According to alternative embodiments, any of a variety of latch mechanisms may be used and may be configured to allow the latch to be actuated in the same direction at the front side and the back side of the console (e.g., a latch that rotates about an axis along the side of the bin, or the like).

A console with a dual latching storage enclosure for a vehicle is disclosed. The console includes a base, an armrest, and a storage enclosure. The base is coupled to the vehicle. The armrest is coupled to the base and moves (e.g., pivots) between a first position (usable by a first occupant as armrest) and a second position (to provide the first occupant access to the storage enclosure). The storage enclosure is movable between a stowed position and a deployed position wherein the deployed position provides access to a second occupant. In the deployed position, a storage space in front of the storage enclosure is enlarged (e.g., to accommodate additional or different items).

It is also important to note that the construction and arrangement of the elements of the storage enclosure as shown in the preferred and other exemplary embodiments are illustrative only. The latch design allows a drawer or sliding bin to be released from either the front side or the back or rear side so that occupants in different seating rows may interface or access the drawer or bin. Although only a few embodiments of the present invention have been described in detail in this disclosure, those skilled in the art who review this disclosure will readily appreciate that many modifications are possible (e.g., variations in sizes, dimensions, structures, shapes and proportions of the various elements, values of parameters, mounting arrangements, materials, colors, orientations, etc.) without materially departing from the novel teachings and advantages of the claims. It is to be understood that the claims are not limited to the details of construction and the arrangement of the components set forth in the following description or illustrated in the drawings. The invention is capable of other embodiments or being practiced or carried out in various ways. It is also to be understood that the phraseology and terminology employed herein is for the purpose of description and should not be regarded as limiting. Accordingly, all such modifications are intended to be included within the scope of the appended claims. The order or sequence of any process or method steps may be varied or re-sequenced according to alternative embodiments. In the claims, any means-plus-function clause is intended to cover the structures described herein as performing the recited function and not only structural equivalents but also equivalent structures. Other substitutions, modifications, changes and/or omissions may be made in the design, operating conditions and arrangement of the preferred and other exemplary embodiments without departing from the spirit of the present invention as expressed in the appended claims.

What is claimed is:

1. A console for mounting within a vehicle comprising:
a base configured to be coupled to the vehicle, and
a storage enclosure coupled to the base;
wherein the storage enclosure is movable linearly along an axis between a stowed position and a deployed position relative to the base such that a first occupant is provided access to the storage enclosure,
wherein the deployed position is configured to provide access to a second occupant,
wherein the stowed position is a forward position and the deployed position is a rearward position,
wherein the storage enclosure is slidably coupled to the base by one or more guides, and
wherein the one or more guides is one or more bearings.

2. A console for mounting within a vehicle comprising:
a base configured to be coupled to the vehicle, and
a storage enclosure coupled to the base;
wherein the storage enclosure is movable linearly along an axis between a stowed position and a deployed position relative to the base such that a first occupant is provided access to the storage enclosure,
wherein the deployed position is configured to provide access to a second occupant, and
wherein the storage enclosure comprises a latch having a first interface configured for operation by the first occupant in a first row of seats, and a second interface configured for operation by the second occupant in a second row of seats.

3. The console of claim 2, wherein the stowed position is a forward position and the deployed position is a rearward position.

4. The console of claim 3, wherein the storage enclosure is slidably coupled to the base by one or more guides.

5. The console of claim 2, wherein the latch is configured to pivot about a pivot axis to disengage the storage enclosure from a projection.

6. The console of claim 5, wherein the projection extends from the base.

7. The console of claim 5, wherein the latch further comprises a biasing device to bias the latch to engage the projection.

8. The console of claim 7, wherein a portion of the latch forward of the pivot axis pivots upward when the first occupant of the first row of seats operates the latch, and a portion of the latch rearward of the pivot axis pivots downward when the second occupant of the second row of seats operates the latch.

9. A console for mounting within a vehicle comprising:
a base configured to be coupled to the vehicle,
a generally horizontal panel coupled to the base, and
a storage enclosure coupled to the base;
wherein the storage enclosure is movable linearly along an axis between a stowed position and a deployed position relative to the base such that a first occupant is provided access to the storage enclosure,
wherein the deployed position is configured to provide access to a second occupant, and
wherein the storage enclosure is independent from the panel and the storage enclosure is movable between the stowed position and the deployed position relative to the base and the panel to provide the first occupant access to the storage enclosure.

10. The console of claim 9, wherein the panel is an armrest.

11. A console for mounting within a vehicle comprising:
a base configured to be coupled to the vehicle, and
a storage enclosure coupled to the base;
wherein the storage enclosure is slidingly movable between a stowed position and a deployed position relative to the base such that a first occupant is provided access to the storage enclosure,
wherein the deployed position is configured to provide access to a second occupant, and
wherein the storage enclosure comprises a latch having a first interface configured for operation by the first occupant in a first row of seats, and a second interface configured for operation by the second occupant in a second row of seats.

12. The console of claim 11, wherein the storage console is slidingly movable in a linear direction.

13. The console of claim 11, wherein the stowed position is a forward position and the deployed position is a rearward position.

14. The console of claim 11, wherein the storage enclosure is slidably coupled to the base by one or more guides.

15. The console of claim 11, wherein the latch is configured to pivot about a pivot axis to disengage the storage enclosure from a projection.

16. The console of claim 15, wherein the projection extends from the base.

17. The console of claim 15, wherein the latch further comprises a biasing device to bias the latch to engage the projection.

18. The console of claim 17, wherein a portion of the latch forward of the pivot axis pivots upward when the first occupant of the first row of seats operates the latch, and a portion of the latch rearward of the pivot axis pivots downward when the second occupant of the second row of seats operates the latch.

19. A console for mounting within a vehicle comprising:
a base configured to be coupled to the vehicle,
a generally horizontal panel coupled to the base, and
a storage enclosure coupled to the base;
wherein the storage enclosure is slidingly movable between a stowed position and a deployed position relative to the base such that a first occupant is provided access to the storage enclosure,
wherein the deployed position is configured to provide access to a second occupant, and
wherein the storage enclosure is independent from the panel and the storage enclosure is movable between the stowed position and the deployed position relative to the base and the panel to provide the first occupant access to the storage enclosure.

20. The console of claim 19, wherein the panel is an armrest.

21. A console for mounting within a vehicle comprising:
a base configured to be coupled to the vehicle, and
a storage enclosure coupled to the base;
wherein the storage enclosure is movable between a stowed position and a deployed position relative to the base such that a first occupant is provided access to the storage enclosure,
wherein the deployed position is configured to provide access to a second occupant, and
wherein the storage enclosure comprises a latch having a first interface configured for operation by the first occupant in a first row of seats, and a second interface configured for operation by the second occupant in a second row of seats.

22. The console of claim 21, wherein the storage console is movable in a linear direction.

23. The console of claim 21, wherein the latch is configured to pivot about a pivot axis to disengage the storage enclosure from a projection.

24. The console of claim 23, wherein the projection extends from the base.

25. The console of claim 23, wherein the latch further comprises a biasing device to bias the latch to engage the projection.

26. The console of claim 25, wherein a portion of the latch forward of the pivot axis pivots upward when the first occupant of the first row of seats operates the latch, and a portion of the latch rearward of the pivot axis pivots downward when the second occupant of the second row of seats operates the latch.

* * * * *